April 25, 1939.　　　J. GRIGNOLO　　　2,155,543
FRUIT PICKER
Filed June 5, 1937　　2 Sheets-Sheet 1
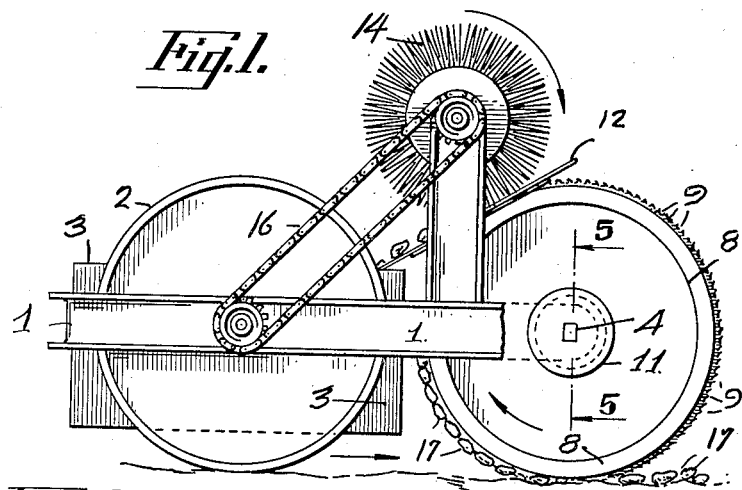
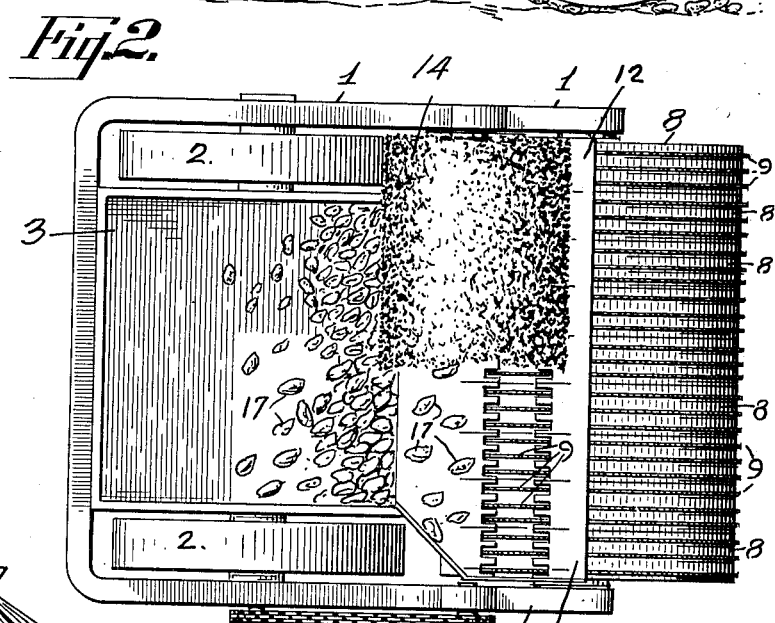
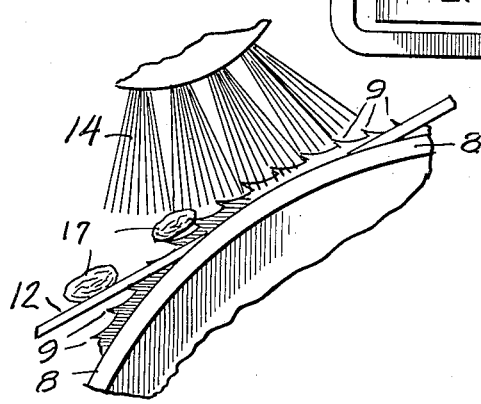
INVENTOR.
JUVENAL GRIGNOLO
HIS ATTORNEY.

April 25, 1939.  J. GRIGNOLO  2,155,543
FRUIT PICKER
Filed June 5, 1937  2 Sheets-Sheet 2
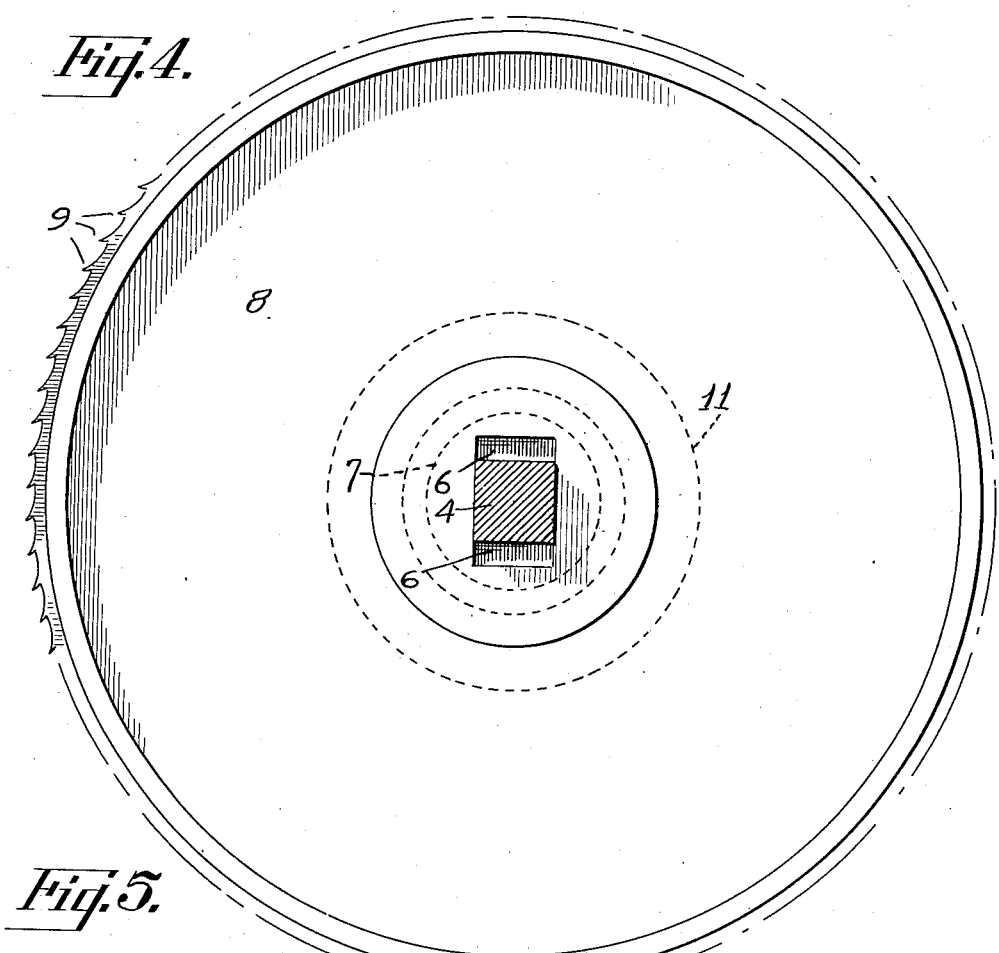
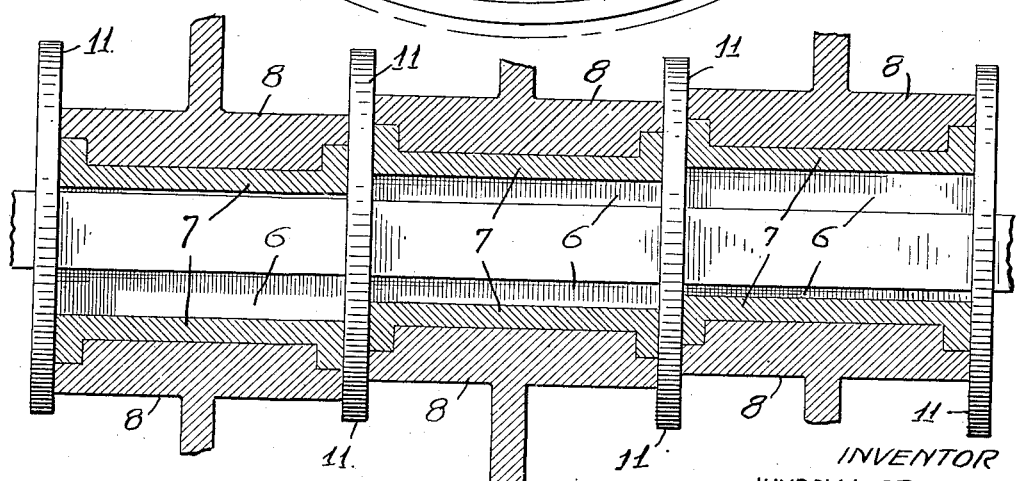
INVENTOR
JUVENAL GRIGNOLO
HIS ATTORNEY.

Patented Apr. 25, 1939

2,155,543

UNITED STATES PATENT OFFICE 2,155,543

FRUIT PICKER

Juvenal Grignolo, San Francisco, Calif.

Application June 5, 1937, Serial No. 146,655

2 Claims. (Cl. 56—328)

My invention relates to improvements in a fruit picking machine wherein a plurality of independently vertically movable wheels, rotatably mounted upon a carriage and provided with impaling elements, independently ride over and contact portions of an uneven surface, such as broken or tilled soil, from which fruit is to be picked, and operate in conjunction with stripping means for stripping fruit from said impaling means and onto a chute delivering to a receptacle on said carriage.

The primary object of the present invention is to provide a new and improved fruit picker of simple, effective and economical construction and operation.

Another object is to provide a new and improved fruit picker having improved means for effectively contacting substantially all portions of an uneven surface, such as broken or tilled soil, and pick fruit therefrom.

A further object is to provide a new and improved device of the character described having improved means for stripping picked fruit from an impaling means without serious injury to said fruit.

I accomplish these and other objects by means of the improved device disclosed in the drawings forming a part of the present application, and in which—

Fig. 1 is a side elevation of my improved device;

Fig. 2 is a partly broken plan view thereof;

Fig. 3 is an enlarged broken detail;

Fig. 4 is an enlarged view of one of the wheels disclosing the manner in which it is mounted for vertical movement relatively to its axle; and Fig. 5 is an enlarged, broken sectional view taken on line 5—5 of Fig. 1, in the direction indicated.

Referring to the drawings the numeral 1 is used to designate a suitable carriage supported by wheels 2 and provided with a receptacle 3 for receiving picked fruit.

The carriage 1 is also provided with a square or rectangular shaft 4 slidably engaging for limited vertical movement the vertically disposed slots 6 of a plurality of bearings 7 upon each of which in turn is rotatably mounted a wheel 8 provided upon its periphery with several rows of impaling elements 9. The shaft 4 is also provided with a plurality of fixed discs 11, one between each bearing 7, for preventing longitudinal movement of said bearings upon said shaft 4 so that while the wheels 8 may move vertically and independently of each other they are held against longitudinal movement upon said shaft 4, the purpose of which independently vertically movable wheels 8 will hereinafter be more fully set forth.

A slitted and slotted flexible chute 12 has its upper end resting upon and extending beyond the point of contact with the upper portions of the wheels 8 and inclines downwardly to deliver into the receptacle 3 on the carriage 1. The chute 12 is made flexible in order that the upper or slotted end thereof may readily maintain contact with the upper portions of the peripheries of the independently vertically movable wheels 8 as they independently rise and fall when traversing different or separate portions of an uneven surface over which the carriage 1 is moving.

A rotatable brush 14 is mounted upon the carriage 1 directly above the slitted and slotted portion of the flexible chute 12 and is rotated by means of a chain or other suitable drive 16 connected to the wheels 2 of the carriage 1.

In operation, as the carriage 1 is moved forwardly, as indicated by the straight arrow in Fig. 1 of the drawings, the wheels 8, movable vertically on the square shaft 4, readily rise and fall with respect to said shaft 4 while traversing uneven or broken ground from which the fruit 17 is to be picked, the vertically movable bearings 7 readily permitting each wheel to independently effect contact with its particular portion of ground and negotiate depressions or projections of an uneven surface to permit the impaling elements 9 to impale and pick fruit, such as olives, prunes and similarly shaped fruit from said uneven surface. As the carriage advances the wheels 8, with their impaled harvest, are rotated by contact with the surface over which they are riding and the fruit 17 is carried by said impaling elements 9 to the upper portions of said wheels, readily passing under the flexible chute 12 at its slotted and slitted portion to the upper portion of said wheels where it is encountered and brushed off of said impaling elements 9 by the rotating brush 14, as disclosed in Figs. 1 and 3 of the drawings. As the fruit 17 falls onto the chute 12 it is rolled downwardly into the receptacle 3 of the carriage 1. It will be readily understood that the flexible nature of the upper or slitted portion of the chute 12 will readily permit contact of said upper end of said chute with the tops of the wheels 8 regardless of their various elevations while traversing an uneven surface whereby stripped fruit may be easily delivered to said chute and through it to the receptacle 3.

It is obvious that lumps of dirt will be broken by the impaling elements 9 while the fruit 17, being more solid and viscous, will readily adhere or stick to said elements, until removed by the action of the revolving brush 14.

It is also obvious that the gentle action of the bristles of said brush, as well as the flexible nature of the chute 12 will engage said fruit without unduly damaging the same.

Having described my invention I claim—

1. A pick-up drum device, for use with a fruit gatherer having a carriage and a chute, of a square shaft rigidly mounted transversely of said carriage; a plurality of vertically slotted bearings slidably mounted for limited vertical movement on said shaft; and a fruit-impaling wheel rotatably mounted upon each bearing for conveying fruit from a surface over which said carriage and wheels are moved to convey fruit from said surface to said chute.

2. A pick-up drum device, for use with a fruit gatherer having a carriage, a chute and stripping means associated with said chute, of a square shaft rigidly mounted transversely of said carriage; a plurality of vertically slotted bearings slidably mounted for limited vertical movement on said shaft; and a fruit impaling wheel rotatably mounted upon each bearing and contacting said stripping means to convey fruit from a surface over which said carriage and wheels are moved to convey fruit from said surface to said stripping means.

JUVENAL GRIGNOLO.